United States Patent
Khim et al.

(10) Patent No.: US 11,585,661 B2
(45) Date of Patent: Feb. 21, 2023

(54) PHYSICAL EVENT TRIGGERING OF VIRTUAL EVENTS

(71) Applicant: Sony Interactive Entertainment LLC, San Mateo, CA (US)

(72) Inventors: Jeansoo Khim, San Jose, CA (US); Steven Osman, San Francisco, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 338 days.

(21) Appl. No.: 16/899,208

(22) Filed: Jun. 11, 2020

(65) Prior Publication Data
US 2021/0389130 A1    Dec. 16, 2021

(51) Int. Cl.
| G01C 21/16 | (2006.01) |
| G01S 19/42 | (2010.01) |
| G01C 21/20 | (2006.01) |
| G06F 9/54 | (2006.01) |

(52) U.S. Cl.
CPC ........... *G01C 21/165* (2013.01); *G01C 21/20* (2013.01); *G01S 19/42* (2013.01); *G06F 9/542* (2013.01)

(58) Field of Classification Search
CPC .. G06F 3/0346; G06F 3/04815; G06F 3/0482; G06F 2200/1637; G06F 9/542; G06T 13/40; G06T 19/006; G01C 21/165; G01C 21/20; G01S 19/42
See application file for complete search history.

(56) References Cited

U.S. PATENT DOCUMENTS

| 9,983,697 | B1 * | 5/2018 | Gribetz | G06T 19/006 |
| 10,373,342 | B1 * | 8/2019 | Perez, III | G02B 27/017 |
| 11,086,392 | B1 * | 8/2021 | Sztuk | G06F 3/1423 |
| 2016/0196667 | A1 | 7/2016 | Densham et al. | |
| 2017/0243324 | A1 * | 8/2017 | Mierle | G02B 27/017 |
| 2017/0336882 | A1 * | 11/2017 | Tome | G06F 3/03547 |
| 2017/0374343 | A1 * | 12/2017 | Boulton | H04N 13/117 |
| 2018/0186466 | A1 * | 7/2018 | Cole | G06F 3/012 |
| 2018/0224930 | A1 * | 8/2018 | Folmer | G06T 13/20 |
| 2019/0180525 | A1 * | 6/2019 | Matsuda | G07C 5/085 |
| 2019/0237044 | A1 * | 8/2019 | Day | G09G 5/377 |

FOREIGN PATENT DOCUMENTS

CN    106293810 A * 1/2017 ......... G06F 9/44505

OTHER PUBLICATIONS

News Release for Six Flags Magic Mountain "The New Revolution—The Most Anticipated Virtual Reality Coaster For 2016 is Ready to Launch!", 2016. Downloaded from the internet on May 21, 2020, downloaded from.
International Search Report & Written Opinion dated Aug. 20, 2021 for International Patent Application No. PCT/US2021/035276.

* cited by examiner

*Primary Examiner* — Dung Hong
(74) *Attorney, Agent, or Firm* — JDI Patent; Joshua D. Isenberg; Robert Pullman

(57) ABSTRACT

A method, system and computer program tie physical events to virtual events by analyzing motion information from a detecting device or analyzing contextual information, initiating a virtual event with a display device in response to detecting an impending change in center of mass motion of a user from analyzing the motion information or contextual information, and associating a virtual event with subsequent motion information from the detecting device.

22 Claims, 7 Drawing Sheets

PHYSICAL EVENT TRIGGERING OF VIRTUAL EVENTS

FIELD OF THE DISCLOSURE

The present disclosure relates to control of applications. Specifically, the present disclosure relates to predictive motion control for applications.

BACKGROUND OF THE INVENTION

Using computing devices in moving vehicles can cause an imbalance in the user's inner ear of that leads to motion sickness. Additionally, while using an application real world events can disturb the user causing a dissonance between events occurring within the application and events occurring in the real world.

Motion control has been used to control computer applications and provide new ways for users to interact with virtual environments. Generally, motion control for computer applications has been limited to translation of deliberate movements of the user into in-game inputs.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
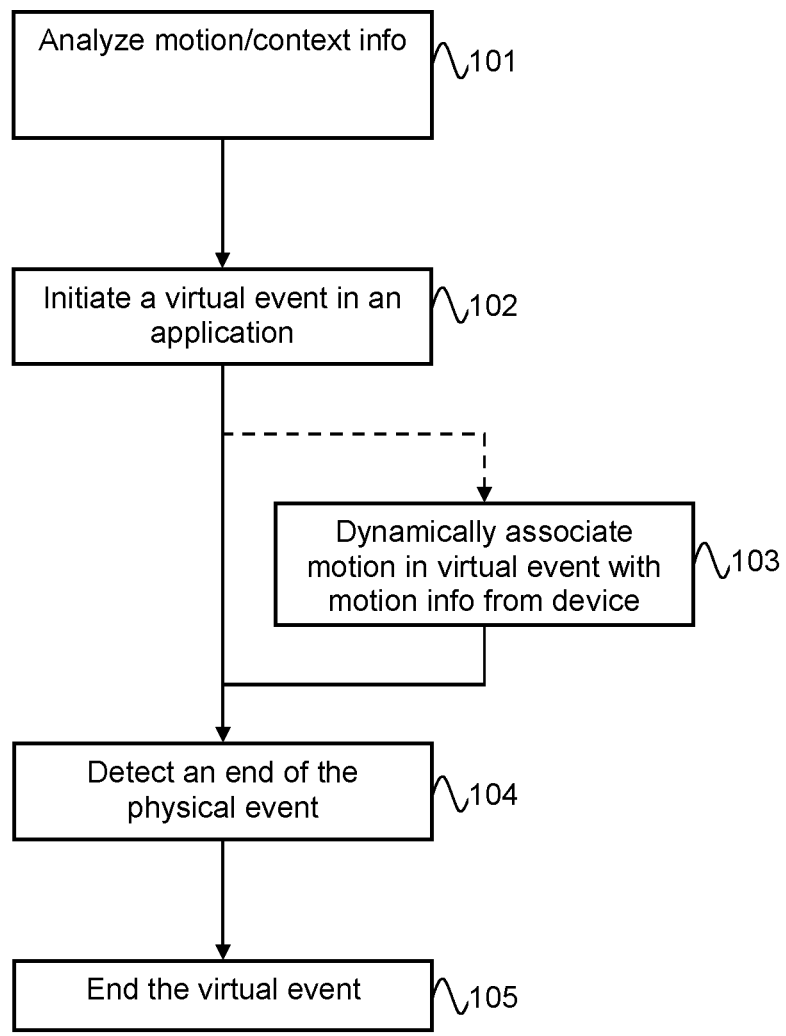
FIG. 1 is a block diagram showing the method for tying impending physical events to virtual events according to aspects of the present disclosure.

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

While numerous specific details are set forth in order to provide a thorough understanding of embodiments of the invention, those skilled in the art will understand that other embodiments may be practiced without these specific details. In other instances, well-known methods, procedures, components and circuits have not been described in detail so as not to obscure aspects of the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in some particular instances, "connected" may indicate that two or more elements are in direct physical or electrical contact with each other. In some other instances, "connected", "connection", and their derivatives are used to indicate a logical relationship, e.g., between node layers in a neural network. "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

According to aspects of the present disclosure, a user's involuntary movements may be translated into virtual events to create an enhanced experience for the user by detecting an impending change in center of mass motion of the user and responding to the impending change with a virtual event. Motion in the virtual event is associated the impending change in center of mass motion of the user. As used herein, the term "center of mass motion" refers to translation of the user's center of mass or rotation of the user about some axis or some combination of these. In the context of rotation, the user's center of mass may lie on the axis about which the user rotates but need not do so.

According to aspects of the present disclosure, motion in virtual events may be tied to physical events. A computer system may detect an impending change in center of mass motion of a user by analyzing motion information from a detecting device or by analyzing contextual information. The computer system may then respond to the detected impending change in center of mass motion by initiating a virtual event with a display device and associating motion in the virtual event with subsequent motion information from the detecting device.

FIG. 1 is a block diagram showing the method for tying impending physical events to virtual events according to aspects of the present disclosure. In the example shown, an impending physical event may be detected at 101 by analyzing motion information from a detecting device or by analyzing contextual information. For example, information from an inertial sensor may be compared to a threshold to determine whether an inertial event is sufficiently perceptible to a user. An impending physical event may be an event that has not yet been felt by the user but will occur and will cause a perceptible change in center of mass motion of the user. The impending physical event may be detected by analyzing motion information from a detecting device, such as an inertial measurement unit or other motion detector, or by analyzing contextual information. The inertial measurement unit (IMU) may include any number of sensors that respond to changes in motion, e.g., accelerometers, gyroscopes, or tilt sensors. To detect an "impending" change in center of mass motion, the system that implements the method is presumably able to detect or predict the change in motion before user is able to experience it.

After an impending physical event has been identified, a corresponding virtual event may be initiated as indicated at 102. Initiation of the virtual event may include for example and without limitation, scheduling the virtual event for a time when the physical event is perceptible to the user or starting the virtual event when the physical event is perceptible to the user. The virtual event may be associated with the physical event by creating events displayed on a display that are similar in some respect to the physical event. The virtual event may be configured to mask or enhance the physical event. By way of example, and not by way of limitation, the virtual event may be an in-application event that involves some form of movement that is coordinated somehow with the physical event. The virtual event may include a change in musical tone or tempo, a change the tone or hue of colors displayed on a screen, a change in events in the application to have additional movement or special minigames. The virtual event may be displayed from any suitable point of view. By way of example, the point of view may be "first person", i.e., one where the display shows a portion of a virtual world from a playable character's point of view. In such a first person point of view, the display shows what the playable character would see. Alternatively, point of view may be configured to show the playable character in virtual world from a suitable vantage point, e.g., from behind the playable character. In some implementation, the point of view may change as the orientation of the display changes, e.g., if the display is part of a hand-held device.

After detecting the impending physical event, the computer system may dynamically associate motion in the virtual event with motion information obtained from the detecting device, as indicated at 103. As used herein, "dynamically associating" refers to contemporaneously obtaining motion information from the detecting device, analyzing the motion information, and displaying corresponding motion in the virtual event according to the obtained motion information. Within this context, "contemporaneously" means within a sufficiently short timeframe that the user does not notice a latency between a physical motion and display of a corresponding motion in the virtual event.

According to some aspects of the present disclosure, a frequency or pattern that characterizes the virtual event may match to a measured frequency or pattern that characterizes the impending physical event or a harmonic of such measured frequency. Matching a frequency or pattern of the virtual event to a frequency or pattern of a physical event may include for example and without limitation matching a beat, tempo, or rhythm of music to repeated pattern of motion that characterizes the physical event. Examples of repeated patterns of motion in a physical event include, but are not limited to, the gait of a horse, the rocking of a boat in response to waves on water, the motion of an airplane in response to air turbulence. As another example is, the shape of terrain or the pattern of turbulence or similar features in a virtual environment, such as a game environment, may change in accordance with the frequency or pattern of the physical event. In this way, the user may feel like the physical event was part of the event in the application. Thus, a physical event that may be scary or unenjoyable becomes more fun. Detection of a frequency or pattern of the physical event may be performed similarly to detection of the impending physical event itself, e.g., through the use of the detection device. The frequency of the physical event may be detected using, for example and without limitation, a threshold and peak detection, where an amplitude of a signal from an inertial sensor is calculated based on the frequency analysis of the data from the detection device and averaged on a set interval or a dynamic moving interval window. The frequency of the physical event may be determined from the number and timing of peaks after the inertial data from the IMU meets or exceeds a threshold.

An end to the physical event may signal to the device to cease the virtual event or enter a standard mode of operation, as indicated at 104. The end to the physical event may determined by comparison of inertial data to the threshold. A comparison of the inertial event to the threshold may determine that the physical event has ceased when the inertial data is below the threshold. In some implementations, the physical event may be determined to have ceased if the inertial data drops below the threshold and stays below the threshold for some predetermined time. The next detected impending physical event would then be a new instance instead of a continuation of the previous instance of a physical event. In some alternative implementations, the previous physical event may cease and a new instance of an impending physical event may begin when the inertial data exceeds a threshold for some predetermined period of time. In this way, the device may account for constant motion of the user or errors in inertial measurement.

After an end to the physical event has been detected, the virtual event may be ended 105. Alternatively, each virtual event may last only a set duration and end after that period 105 regardless of whether the physical event has been determined to end. According to some alternative aspects of the present disclosure virtual events having a set duration may be initiated in succession while a physical event is detected to provide the effect of a continuous virtual event during the duration of the physical event. Once the end of the physical event is detected from inertial data, or the physical event was not detected during a set duration, virtual events may no longer be initiated.

Figure 2:
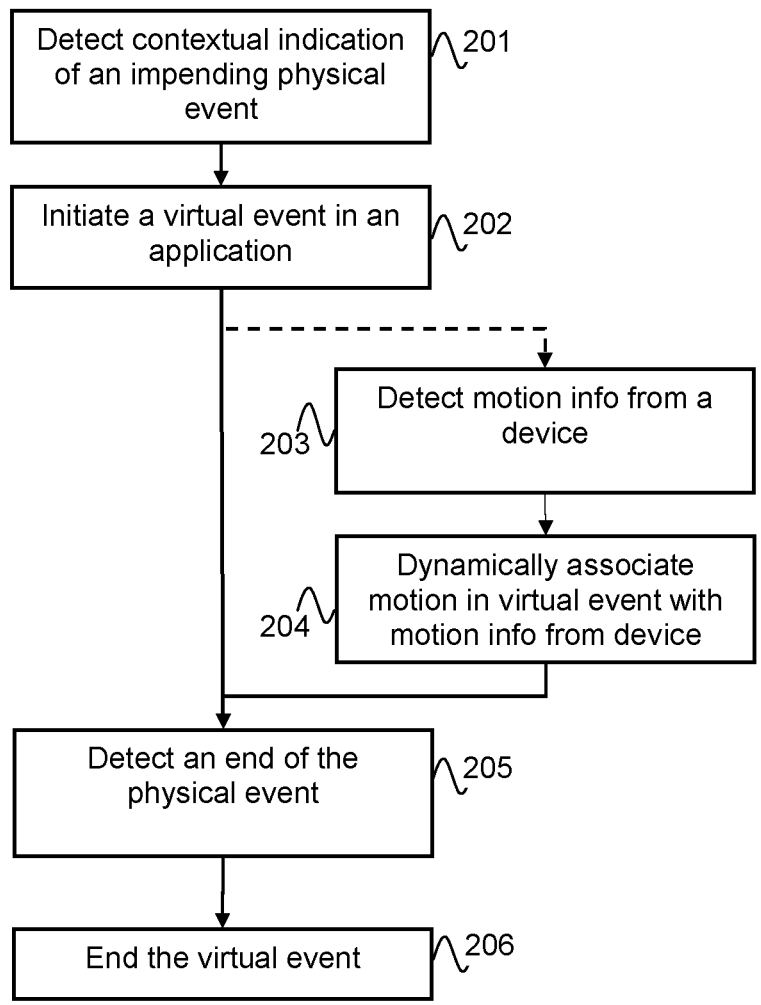
FIG. 2 is a block diagram depicting for contextual detection of impending physical events and tying the impending physical event to virtual events according to aspects of the present disclosure.

FIG. 2 is a flow diagram depicting an example of contextual determination of impending physical events and tying the impending physical event to virtual events according to aspects of the present disclosure. Contextual determination of impending physical events at 201 may involve using contextual information to determine whether there is an impending physical event. As discussed above, the impending physical event is one that would result a change in center of mass motion of the user. The contextual information may include information from other applications, such as information indicating whether a device is in a particular mode of operation, an image taken by an image capture unit or geographic information relating to a past, present, or future location of the user and/or the user's device. Additionally, contextual detection may use information provided by other systems such as computing devices in aircrafts or motor vehicles. By way of example and not by way limitation a contextual event may occur when a user changes a device setting, such as the airplane mode on a cellphone or game device. The device may detect that the user has changed a setting to place the device in airplane mode. From change of the device to airplane mode setting the device may determine that there is an impending physical event, e.g., imminent takeoff of an aircraft.

Figure 3:
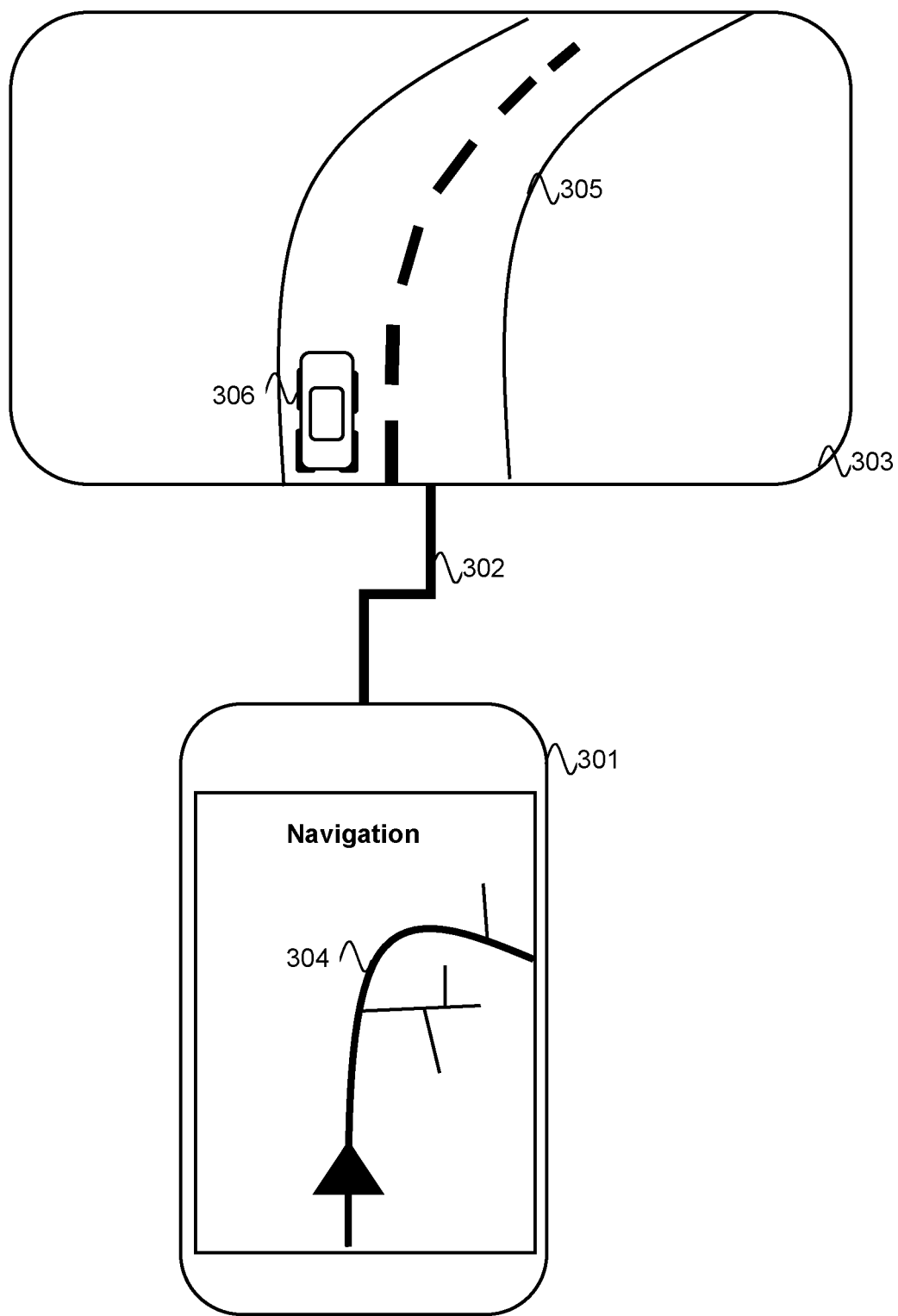
FIG. 3 is a diagram depicting a contextually determined impending physical event associated with a virtual event according to aspects of the present disclosure.

Another example of contextual event detection of impending physical events may be through the use of navigation data as shown in FIG. 3. A user may start a navigation app on a device 301 in communication by suitable link 302 with a virtual event application that associates an impending physical event with a virtual event 303. The virtual event application, e.g., a video game, may run on the same device 301 as the navigation app or on a different device. As shown, when information from the navigation app indicates an impending navigation event such as the user is going to make a turn 304, the virtual event application may determine an impending physical event and tie the determined impending physical event to the virtual event 303. As shown a motion in the virtual event 303 is associated with the motion in the impending physical event 304 because both the gameplay vehicle 306 and the user 301 are making right turns 305, 304. It should be noted that the association of motion in virtual events to physical events is not limited to turns in the same direction and motion in the virtual event may be associated in any way that takes advantage of the feeling of movement a user has during a change in center of mass motion. In other alternative aspects of the present disclosure, the virtual event application may use images from an image capture unit to predict an impending physical event. For example and without limitation the device running the virtual event application may include an image capture unit such as a camera or video camera. The image capture unit may be pointed at a screen in an airplane or car showing navigation data such as takeoff time or turn-by-turn directions. Images obtained from the image capture unit may be analyzed by, e.g., an object detection algorithm, character recognition algorithm or image recognition algorithm (e.g., machine vision), to determine impending navigation events. Navigation events may include such events as airplane take-off, airplane landing, and airplane or other vehicle turns.

After the impending physical event is determined, a virtual event 305 may be initiated at 202. The virtual event 305 shown is a right turn and matches the right turn detected by the navigation app 304. According to some aspects of the present disclosure navigation system and the application for tying physical events to virtual events may coordinate to provide similar virtual events to the navigation events, which were estimated ahead of time using navigation map data and also determined on real time by the navigation system. Alternatively, a random virtual event or single type of virtual event may be initiated regardless of the type of navigation event where the association between the motion of the user and the virtual event is simply that there is a change in motion of the user and a change in motion in the virtual event. The application may also use navigation data such as the speed and heading of the user to determine when to initiate the virtual event at 202.

Referring again to FIG. 2, motion information is obtained from a device, e.g., an inertial sensor, navigation system, etc., as indicated at 203. By way of example, and not by way of limitation the application that generates the virtual events may optionally use contextual events to determine a frequency of a physical event. The contextual events may be navigation events from a navigation system. For example, and without limitation the navigation system may show that the vehicle is on a windy road that switches back at a fixed interval from this information the fixed interval may be used as a frequency of physical events. Alternatively, inertial information from one or more IMUs may be used to determine a frequency of the physical event, as discussed above.

Figure 5:
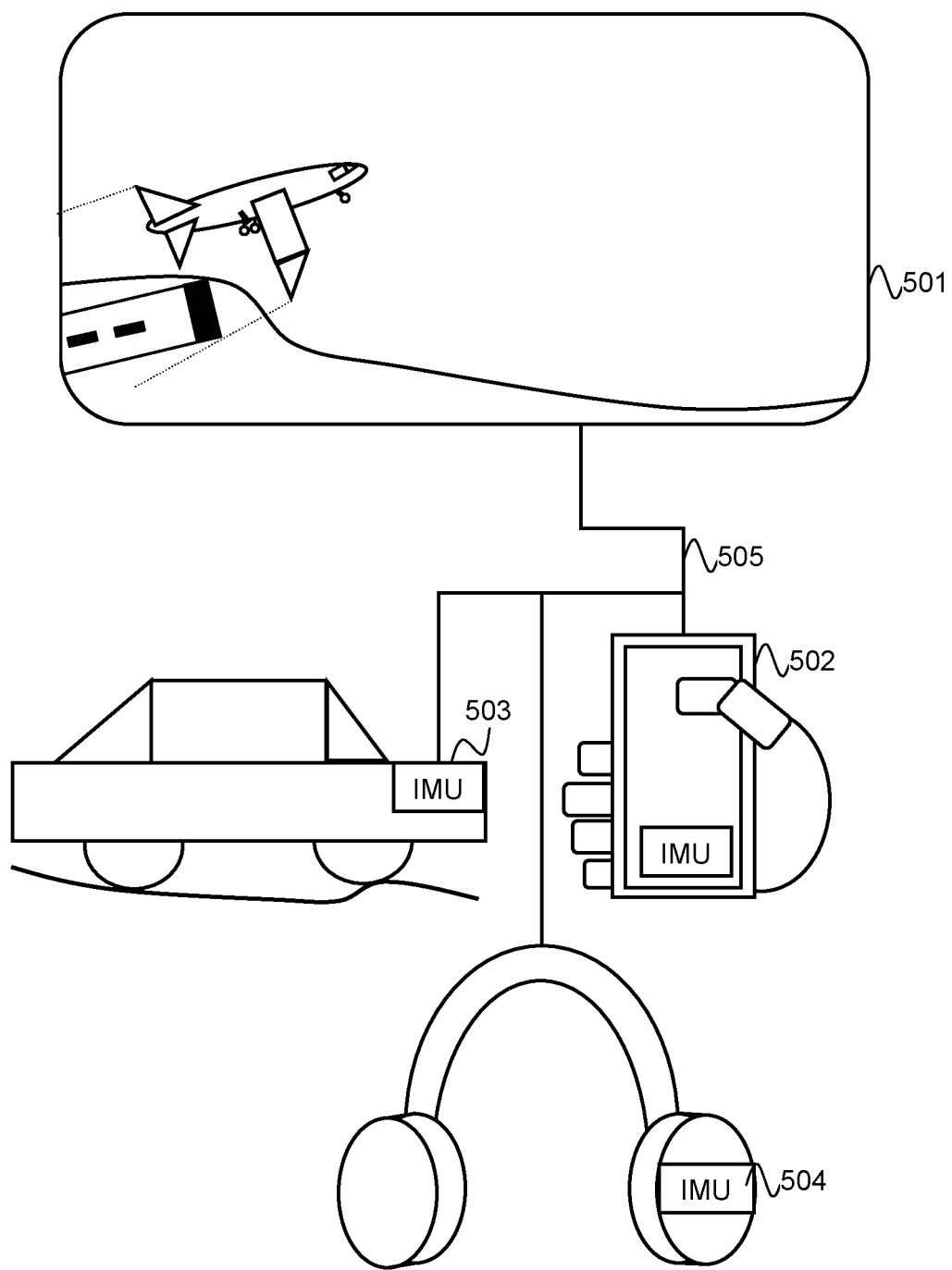
FIG. 5 is a diagram showing the association of devices detecting an impending physical event and a virtual event displayed on a display device according to aspects of the present disclosure.

After obtaining motion information, the application dynamically associates motion in the virtual event with motion information from the device, as indicated at 204. In some implementations, such association may involve matching a frequency of physical events to the frequency of corresponding virtual events. FIG. 5 further depicts an example of associating virtual events to impending physical events and matching the frequency of the physical event to the virtual events.

Figure 4:
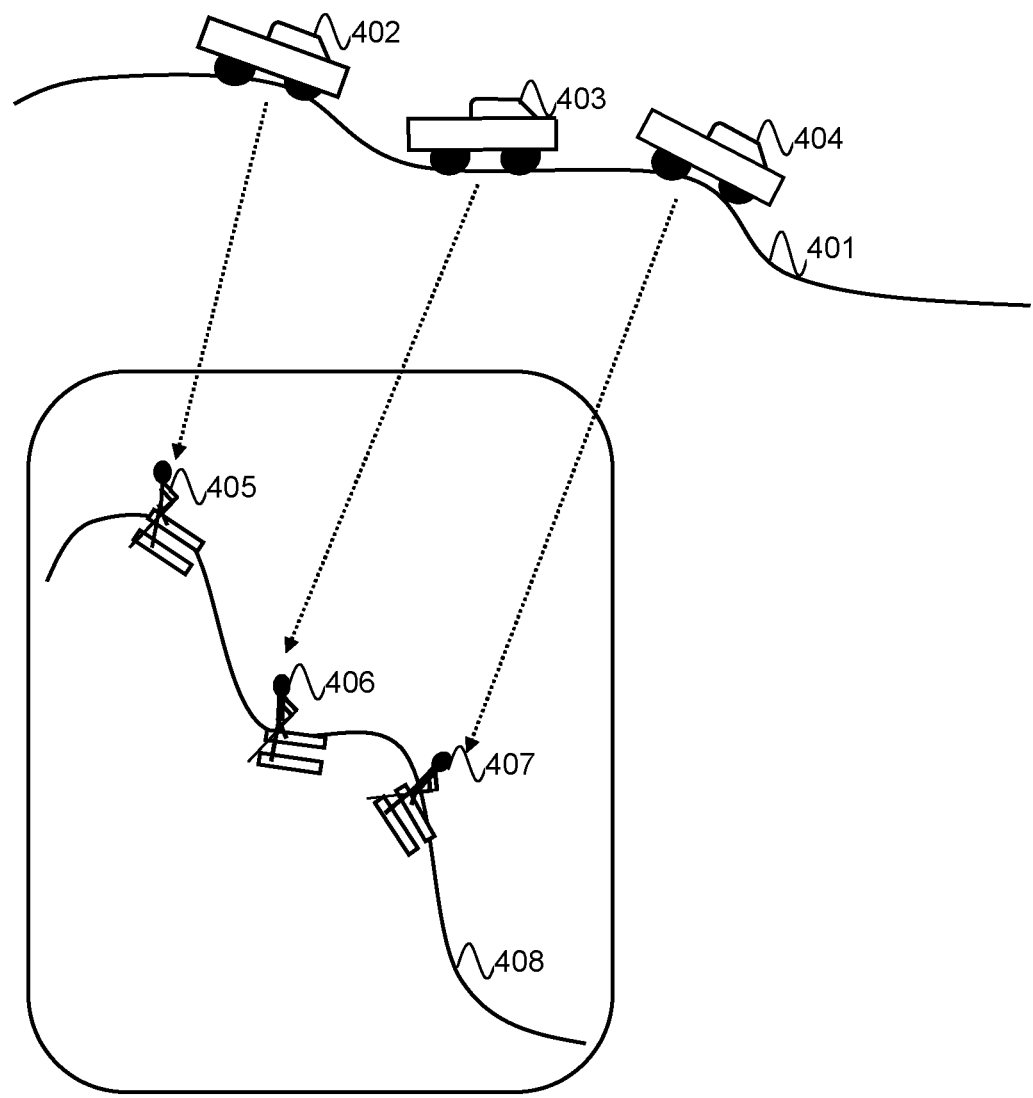
FIG. 4 is a diagram depicting matching movements of the physical event to the virtual event according to aspects of the present disclosure.

FIG. 4 is a diagram showing the association of devices detecting an impending physical event and a virtual event displayed on a display device according to aspects of the present disclosure. These devices may provide contextual data for detecting contextual events and determining an impending physical event. Here, contextual data such as a navigation information includes topographic map data that may be used to determine the frequency at which the user is going to experience an elevation change 401 based on a position, speed and heading of the user or vehicle 402. Alternatively, the IMU may detect changes in elevation 401. These detected impending changes in elevation of the user 401 may be translated into virtual events 406 that match or approximate the physical events 401. In particular, information relating to motion and/or changes in motion may be estimated for the impending physical event may be used to generate simulated motion occurring in a corresponding virtual event.

In the example depicted in FIG. 4, the user is in a vehicle traveling 402 on a road with many elevation changes 401. The virtual events are initiated to match the frequency of elevation changes 408 of the physical events 401. As shown, the virtual events are in the form of elevation changes of a skier 405, 406, 407 in a skiing videogame. As the user changes in elevation from the top of a mountain 402 to the middle of the mountain 403 to the bottom of the mountain 404 so does the skier change position from the top of a ski-slope 405 to the middle of the ski-slope 406 to the bottom of the ski-slope 407. The position and incline of the slope that the user will be traveling upon many be determined through the user of topographic information from the navigation system or using data from one or more IMUs. The timing of the frequency of elevation changes in the skiing game is matched to the timing of physical elevation changes of the user so that the user feels a change in his physical elevation at the same time his skier is experiencing a steeper slope, indicative of a faster change in elevation. This would provide the user with a virtual event that matches the physical sensation of a quick change in elevation such as weightlessness or increased gravity.

Referring again to FIG. 2, an end to the physical event may be detected 205 contextually and may signal an end to the virtual event 206. A contextual end to the physical event may be determined for example and without limitation by a change in device mode, a navigation event, or another event determined, e.g., with information obtained from an image capture unit or microphone. Detection of an end to the physical event 205 with a device mode may be for example exiting an airplane mode on a device. Contextual events such as navigation events may be used to determine and end to physical events by detecting when a turn will end, a slope will level off or a road will straighten out. Detecting an end to a physical event with an image capture unit or a microphone may involve detecting certain visual or audio cues. By way of example and without limitation, the system may detect that a fasten seatbelt sign has been turned off either with an image capture unit or a microphone. The virtual event may be completed and the application may enter a normal event mode where events controlled by the application are not associated with physical events 206.

FIG. 5 is a diagram showing the association of devices detecting an impending physical event and a virtual event displayed on a display device according to aspects of the present disclosure. According to some aspects of the present disclosure, multiple different devices may be used in detection of an impending physical event. As shown in FIG. 3, a virtual event displayed on a display device 501 may be associated with an impending physical event detected by multiple different devices each having an IMU. The devices shown include a hand-held device with IMU 502, a vehicle equipped with an IMU 503, and a pair of headphones equipped with an IMU 504. As used herein, the term "handheld device" generally refers to any device configured to be held in a user's hand or hands when in normal operation. By way of example and not by way of limitation, handheld devices include cellphones, portable game devices, tablet computers, laptop computers and the like.

The vehicle equipped with the IMU 503 may be a, plane, train, car, helicopter or other conveyance. The devices may communicate with each other via a wired or wireless connection. The wired or wireless connection may be a wired or wireless internet connection, a wired or wireless network connection, Bluetooth connection, nearfield communication (NFC) connection, an optical connection, an acoustic connection, or an Ethernet or other wired communication standard connection. The display device 501 may receive virtual event display information from the application for associating impending physical events to virtual events. The application may be running on a single device such as the handheld device of any number of devices. According to some alternative aspects of the present disclosure, use of different devices may enable better detection of impending physical events. For example, a user wearing IMU equipped headphones 504 may be an occupant in a car also having an IMU 503. The car may encounter a bumpy road causing the IMU to detect momentary vertical acceleration that is over the threshold. This momentary vertical acceleration may not yet be detected by the IMU in the headset indicating that the shock from the bumpy road has not been translated from the car to the user yet. Thus, the window of time in which to initiate a virtual event to coincide with the physical event is still open. Timing of initiation of the virtual event is configured to occur within a time period for which the difference in the time between the start of the user's experience of the physical event and the start of the corresponding virtual event is imperceptible. For example and without limitation the time between detection of a physical event and initiation of the virtual event may be less than 100 milliseconds (ms).

Figure 6:
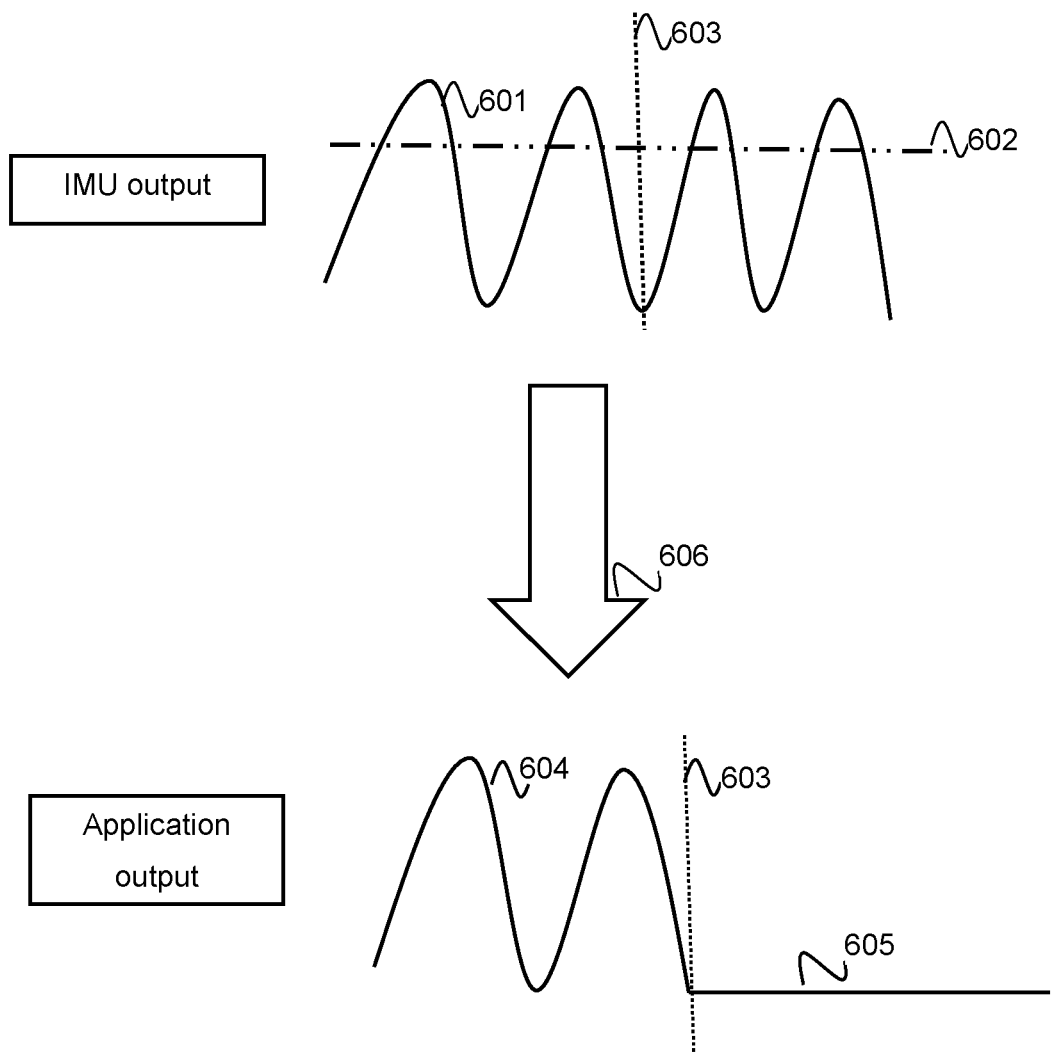
FIG. 6 is a diagram showing the filtering regular physical events from the virtual events according to aspects of the present disclosure.

FIG. 6 is illustrates filtering regular, e.g., periodically recurring, physical events from the virtual events according to aspects of the present disclosure. Examples of periodically recurring events include, but are not limited to, up and down motion of a rider on a horse, rocking of a boat in response to waves on water, vertical motion of an automobile travelling at a relatively constant speed over regularly spaced bumps in a road. As shown, an IMU may provide inertial information 601 that shows peaks over the physical event threshold 602 at regular intervals. After a certain number of peaks, occurring at regular intervals past a regular event threshold 603 the physical events may be filtered so that virtual events are not shown for regular physical events after the regular event threshold 603. Thus, when Physical events are associated with virtual events 606, the virtual event 604, as depicted may have an intensity or an occurrence that mirrors the physical events 601. After the regular event threshold 603, virtual events may not be initiated 605. In this way, the virtual events may simulate the way a user becomes accustomed to regular movements felt during travel, such as the rocking of a ship, or train. In some implementations, historical information may be used to determine whether a change in motion similar to the impending change in motion has occurred in a recent history. In the context of such implementations, "recent" can be regarded as within a time that is of the order of the period of the regular event.

System

Figure 7:
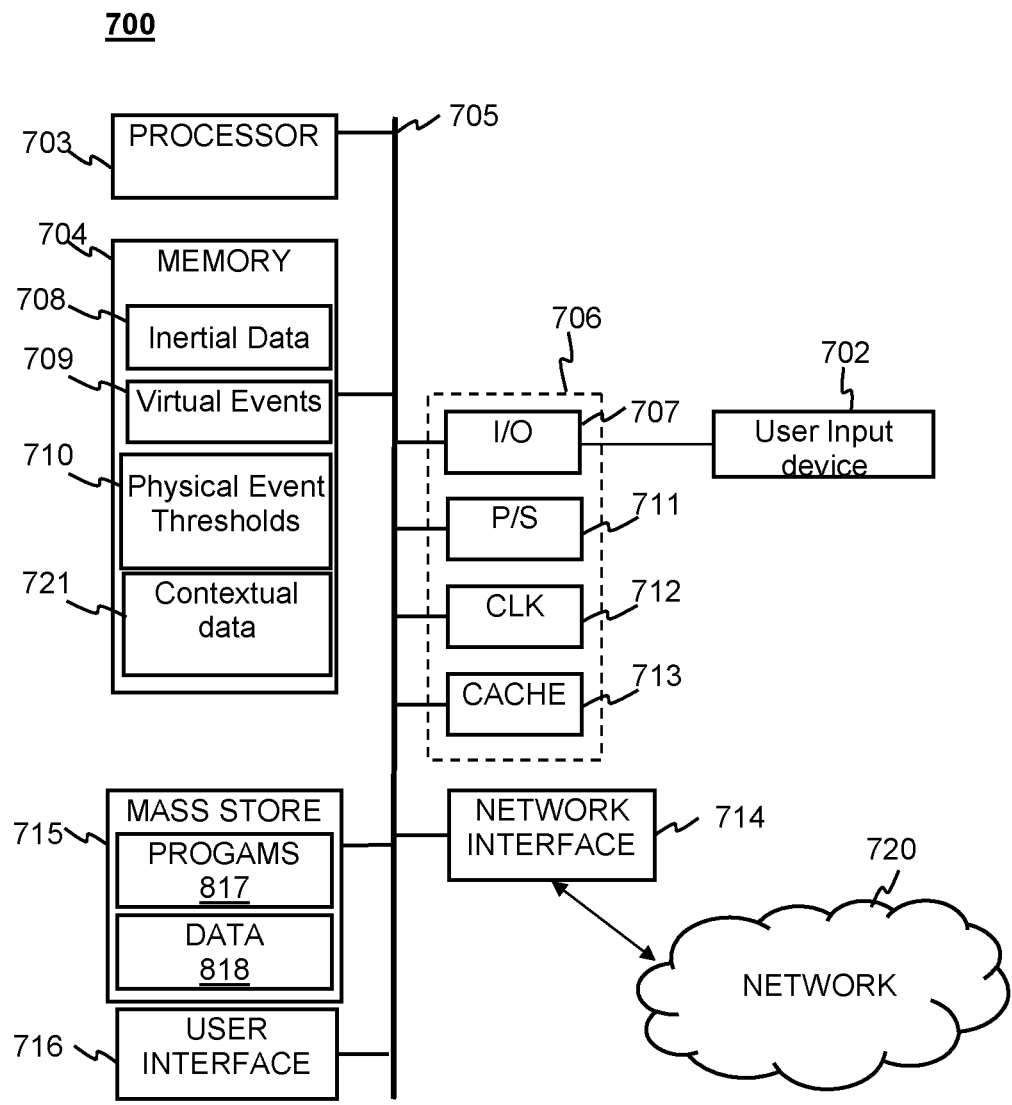
FIG. 7 is a block system diagram showing a system for tying impending physical events to virtual events according to aspects of the present disclosure.

FIG. 7 depicts the system 700 configured to tie physical events to virtual events according to aspects of the present disclosure. The system 700 may include one or more processor units 703, which may be configured according to well-known architectures, such as, e.g., single-core, dual-core, quad-core, multi-core, processor-coprocessor, cell processor, and the like. The marketplace server may also include one or more memory units 704 (e.g., random access memory (RAM), dynamic random-access memory (DRAM), read-only memory (ROM), and the like).

The processor unit 703 may execute one or more programs 717, portions of which may be stored in the memory 704 and the processor 703 may be operatively coupled to the memory, e.g., by accessing the memory via a data bus 705. The programs 717 may be configured to tie impending physical events to virtual events 708 according to the method described above with respect to FIG. 1 and/or FIG. 2. In other words, execution of the programs causes the system to analyze motion information from a detecting device or analyze contextual information to detect an impending change in center of mass motion of a user and initiate a virtual event with a display device in response to the impending change in center of mass motion of the user. Motion in the virtual event is dynamically associated the motion information. Additionally, the Memory 704 may contain information about physical event thresholds 710 that are applied to inertial data 708. Such physical event thresholds may include different thresholds for different types of inertial data such as a different threshold for vertical acceleration than horizontal acceleration and/or a jerk (rate of change of acceleration) threshold. The physical event threshold information 710 may also include regular event cutoff thresholds. In addition, the Memory 704 may contain contextual data 721 used for determination of impending physical events such as navigation events, airplane modes, image recognition information, audio recognition information etc. The Memory 704 may also contain data corresponding to virtual events 709. Virtual event data may include audio, video, and gameplay data displayed on a display device during a virtual event. The virtual events, contextual data and physical event thresholds may also be stored as data 718 in the Mass Store 718.

The system 700 may also include well-known support circuits, such as input/output (I/O) 707, circuits, power supplies (P/S) 711, a clock (CLK) 712, and cache 713, which may communicate with other components of the system, e.g., via the bus 705. The computing device may include a network interface 714. The processor unit 703 and network interface 714 may be configured to implement a local area network (LAN) or personal area network (PAN), via a suitable network protocol, e.g., Bluetooth, for a PAN. The computing device may optionally include a mass storage device 715 such as a disk drive, CD-ROM drive, tape drive, flash memory, or the like, and the mass storage device may store programs and/or data. The system may also include a user interface 716 to facilitate interaction between the system and a user. The user interface may include a display device such as monitor, Television screen, speakers, headphones or other devices that communicate information to the user. The display device may include visual, audio, or haptic display or some combination thereof. A user input device 702 such as a mouse, keyboard, game controller, joystick, etc. may communicate with an I/O interface and provide control of the system to a user.

While the above is a complete description of the preferred embodiment of the present invention, it is possible to use various alternatives, modifications and equivalents. It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described but can be practiced with modification and alteration within the spirit and scope of the appended claims. The scope of the invention should therefore be determined with reference to the appended claims, along with the full scope of equivalents to which such claims are entitled. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for tying physical events to virtual events comprising:
   a) analyzing motion information from a detecting device or analyzing contextual information;
   b) initiating a virtual event with a display device in response to detecting an impending change in center of mass motion of the user from analyzing the motion information or contextual information; and
   c) dynamically associating a motion in the virtual event with subsequent motion information from the detecting device.

2. The method of claim 1 wherein the detecting device is an inertial measurement unit of a handheld device.

3. The method of claim 2, wherein detecting the impending change in center of mass motion includes detecting when an acceleration of the handheld device meets or exceeds a threshold.

4. The method of claim 1 wherein the detecting device is an inertial measurement unit on a vehicle.

5. The method of claim 4, wherein detecting the impending change in center of mass motion includes detecting when an acceleration of the vehicle meets or exceeds a threshold.

6. The method of claim 1, wherein the detecting device is an inertial measurement unit on a vehicle and information from an inertial measurement unit of a user's device.

7. The method of claim 6, wherein the user's device is a handheld device held by the user.

8. The method of claim 6, wherein the user's device is a device worn by the user.

9. The method of claim 1, wherein detecting the impending change in center of mass motion includes analyzing contextual information to determine occurrence of a contextual event.

10. The method of claim 9, wherein the contextual event involves a device being placed into airplane mode.

11. The method of claim 9, wherein the contextual event is determined from a GPS or navigation system location.

12. The method of claim 9 wherein the contextual event is determined by machine vision.

13. The method of claim 1 wherein the virtual event is configured to mask the impending change in motion with a virtual movement presented on the display device.

14. The method of claim 1 further comprising determining whether an impending change in motion is a regular event and not initiating a virtual event if the impending change in motion is a regular event.

15. The method of claim 14, further comprising using historical information to determine whether a change in motion similar to the impending change in motion has occurred in a recent history.

16. A system for tying physical events to virtual events comprising:
   a processor;
   a memory coupled to the processor;
   non-transitory instructions embedded in the memory for a method for tying physical events to virtual events comprising:
   a) analyzing motion information from a detecting device or analyzing contextual information; and
   b) initiating a virtual event with a display device in response to an impending change in motion from analyzing the motion information or contextual information; and
   dynamically associating a motion in the virtual event with subsequent motion information from the detecting device.

17. The system of claim 16 further comprising an Inertial measurement Unit (IMU) coupled to the processor wherein the IMU provides impending change in motion information to the processor and wherein detecting the impending change in motion further comprises detecting the impending change in motion from the impending change in motion information.

18. The system of claim 17 wherein the IMU is an accelerometer on a handheld device.

19. The system of claim 17 wherein the IMU is an accelerometer on a device worn by a user.

20. The system of claim 16 further comprising a network adapter coupled to the processor wherein the network adapter provides impending event detection information to the processor.

21. The system of claim 20 wherein the network adapter receives impending event detection information over a network from a remote inertial measurement unit (IMU) not located on the user.

22. Non-transitory computer readable medium having computer readable instructions embedded thereon that when executed cause a computer to carry out a method for tying physical events to virtual events comprising:
   a) analyzing motion information from a detecting device or analyzing contextual information;
   b) initiating a virtual event with a display device in response to detecting an impending change in motion from analyzing the motion information or contextual information; and
   dynamically associating a motion in the virtual event with subsequent motion information from the detecting device.

* * * * *